(12) United States Patent
Rickards

(10) Patent No.: US 6,419,964 B2
(45) Date of Patent: Jul. 16, 2002

(54) METHOD AND APPARATUS FOR MAKING BAIT

(76) Inventor: David O. Rickards, R.D.2 Box 195, Frankford, DE (US) 19945

(*) Notice: Subject to any disclaimer, the term of this patent is extended or adjusted under 35 U.S.C. 154(b) by 102 days.

(21) Appl. No.: 09/848,274

(22) Filed: May 4, 2001

Related U.S. Application Data

(60) Provisional application No. 60/209,785, filed on Jun. 7, 2000.

(51) Int. Cl.[7] ..................... A23L 1/025; A23L 3/015; A23L 3/26
(52) U.S. Cl. ..................... 426/1; 426/240; 426/426; 426/644; 426/805
(58) Field of Search ..................... 426/1, 240, 644, 426/805

(56) References Cited

U.S. PATENT DOCUMENTS

| | | | |
|---|---|---|---|
| 3,361,566 A | 1/1968 | Axelrod | 99/3 |
| 3,988,479 A | 10/1976 | Stephan et al. | 426/1 |
| 4,001,445 A | 1/1977 | Horrocks et al. | 426/250 |
| 4,053,640 A | 10/1977 | Takasugi | 426/1 |
| 4,097,610 A | 6/1978 | Morrison et al. | 426/1 |
| 4,160,847 A | 7/1979 | Orth, Jr. | 426/1 |
| 4,206,236 A | 6/1980 | Orth, Jr. | 426/1 |
| 4,328,024 A | * 5/1982 | Orth, Jr. | 71/15 |
| 4,362,748 A | 12/1982 | Cox | 426/1 |
| 4,466,982 A | 8/1984 | McDonald | 426/1 |
| 4,503,077 A | 3/1985 | Horton | 426/1 |
| 5,281,425 A | 1/1994 | Stribling et al. | 426/1 |
| 5,776,523 A | 7/1998 | Axelrod | 426/1 |

FOREIGN PATENT DOCUMENTS

WO 85/05014 * 11/1985

OTHER PUBLICATIONS

"Value Added Agricultural Product", http://www.farmers-marketonline.com, 2001.*

* cited by examiner

Primary Examiner—Chhaya D. Sayala
(74) Attorney, Agent, or Firm—Richard C. Litman

(57) ABSTRACT

A process for making bait from poultry waste unfit for human consumption, for aquatic food sources such as fish, crab, conch, eel, shrimp, lobster, crayfish, etc. The poultry waste is picked up from chicken farms and poultry processing plants in refrigerated or frozen containers and are forwarded to a processing plant. The poultry waste is processed to eliminate any remaining feathers and internal organs. The breast portions of the poultry waste are removed and separated and are processed according to various specific client requirements in the fishing and crabbing industries. This processing involves further separation and packaging of the poultry waste, which is then sterilized by either radiation (first embodiment process) or ultra high hydrostatic treatment (second embodiment process). The poultry waste is then sent to a distribution center to be sold to various fishing and crabbing industry users.

9 Claims, 3 Drawing Sheets

METHOD AND APPARATUS FOR MAKING BAIT

CROSS-REFERENCE TO RELATED APPLICATION

This application claims the benefit of U.S. Provisional Patent Application Serial No. 60/209,785, filed Jun. 7, 2000.

BACKGROUND OF THE INVENTION

1. Field of the Invention

The present invention relates to a method and apparatus for making bait from poultry waste unfit for human consumption, for aquatic food sources such as fish, crab, conch, eel, shrimp, lobster, crayfish, etc.

2. Description of Related Art

Bait for fish and other seafood is an important part of the seafood industry. Bait has traditionally come from a variety of sources, one of the most popular being the remains from other animal based food processing facilities such as meat, fish and poultry. Interestingly enough, a broad array of fish and crustaceans can be caught with these types of waste materials, which are reflected in the related art.

U.S. Pat. No. 3,988,479 issued to Stephan et al. outlines a process for preparing a heterogeneous liquid proteinaceous fish bait. The process includes forming the heterogeneous liquid proteinaceous material into a fish bait shape and cooling the liquid to form a solid gelatin mass. A polymeric tanning agent is used to form an insoluble skin around the solid gelatin mass. The heterogeneous liquid proteinaceous material includes salmon egg waste and other fish cannery waste to provide an attracting odor for the fish bait.

U.S. Pat. No. 4,053,640 issued to Takasugi outlines a fish bait that is made up of raw fish that has been pulverized and blended with a surfactive agent that is dried by a process which allows the bait to remain raw. The dried fish bait is then pulverized again and is placed into a sealed water permeable container. The fish bait is used by putting the container into the water and letting the taste and smell of the fish bait dispersed through the water attract the desired fish.

U.S. Pat. No. 4,097,610 issued to Morrison et al. outlines a process for making fish bait from commercially suitable and unsuitable salmon eggs. The process specifically involves mixing the salmon eggs and any residual material from the salmon eggs with a binder, such as sugar, and spreading the mixture into an open vessel and swab oil onto the mixture and cook (in a vacuum) into a congealed mass. The congealed mass is again spread and cooked and cut into strips for convenient packaging and sale.

U.S. Pat. No. 4,206,236 issued to Orth, Jr. outlines a process for preserving waste proteinaceous animal food materials against decomposition and decay while being put in the water for extended periods of time. The waste proteinaceous animal food materials are first pulverized and then blended with a polyol having 2 to 8 carbon atoms and 2 to 6 hydroxyl groups. The materials, polyol and attapulgus clay are then mixed together to form a putty, that is extruded into desired shapes. The final product is used as bait for fish and crustaceans.

U.S. Pat. No. 4,362,748 issued to Cox outlines a process for forming shaped edible food products intended for human consumption, animal consumption or as bait for fish and crustaceans. Specific food products formed specifically include dog food, cat food, cottage cheese, caviar and fish bait. The artificial food products must also undergo sterilization if made on a mass production basis.

U.S. Pat. No. 5,281,425 issued to Stribling et al. outlines a process for producing bait food for crabs and lobsters. The process involves retrieving unrendered skeletal remains from the poultry, pork, and beef producing industries and grinding these skeletal remains into a hamburger like consistency and stuffing these materials into sausage casings. The formed sausage casings are sealed and are used in the water to provide an olfactory stimulus to attract crabs and lobsters.

Each patent outlines an important process used to produce bait for fish and crustaceans. Only the process described in the Stribling et al. patent addresses the use of poultry waste as bait for fish and crustaceans. That process is further limited in using only skeletal remains. What is really needed is a process that produces a broader range of poultry waste into bait for fish and crustaceans. Such a process could also utilize more sophisticated technology then that outlined in the processes described in the previous patents.

None of the above inventions and patents, taken either singly or in combination, is seen to describe the instant invention as claimed.

SUMMARY OF THE INVENTION

The invention is a process for making bait from poultry waste unfit for human consumption, for aquatic food sources such as fish, crab, conch, eel, shrimp, lobster, crayfish, etc. The poultry waste is picked up from chicken farms and poultry processing plants in refrigerated or frozen containers and is forwarded to a processing plant. The poultry waste is processed to eliminate any remaining feathers and internal organs and, optionally, to remove the skin. The breast portions of the poultry waste are removed and separated and are processed according to various specific client requirements in the fishing and crabbing industries. This processing involves further separation and packaging of the poultry waste, which is then sterilized by either radiation (first embodiment process) or ultra high hydrostatic treatment (second embodiment process). The poultry waste is then sent to a distribution center to be sold to various fishing and crabbing industry users.

Accordingly, it is a principal object of the invention to provide a process that can convert poultry waste into usable bait for aquatic food sources such as fish, crab, conch, eel, shrimp, lobster, crayfish, etc.

It is another object of the invention to provide a process that successfully utilizes irradiation technology for sterilizing poultry waste.

It is a further object of the invention to provide a process that successfully utilizes ultra high hydrostatic pressure for sterilizing poultry waste.

Still another object of the invention is to provide a source of bait for aquatic food sources such as fish, crab, conch, eel, shrimp, lobster, crayfish, etc.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
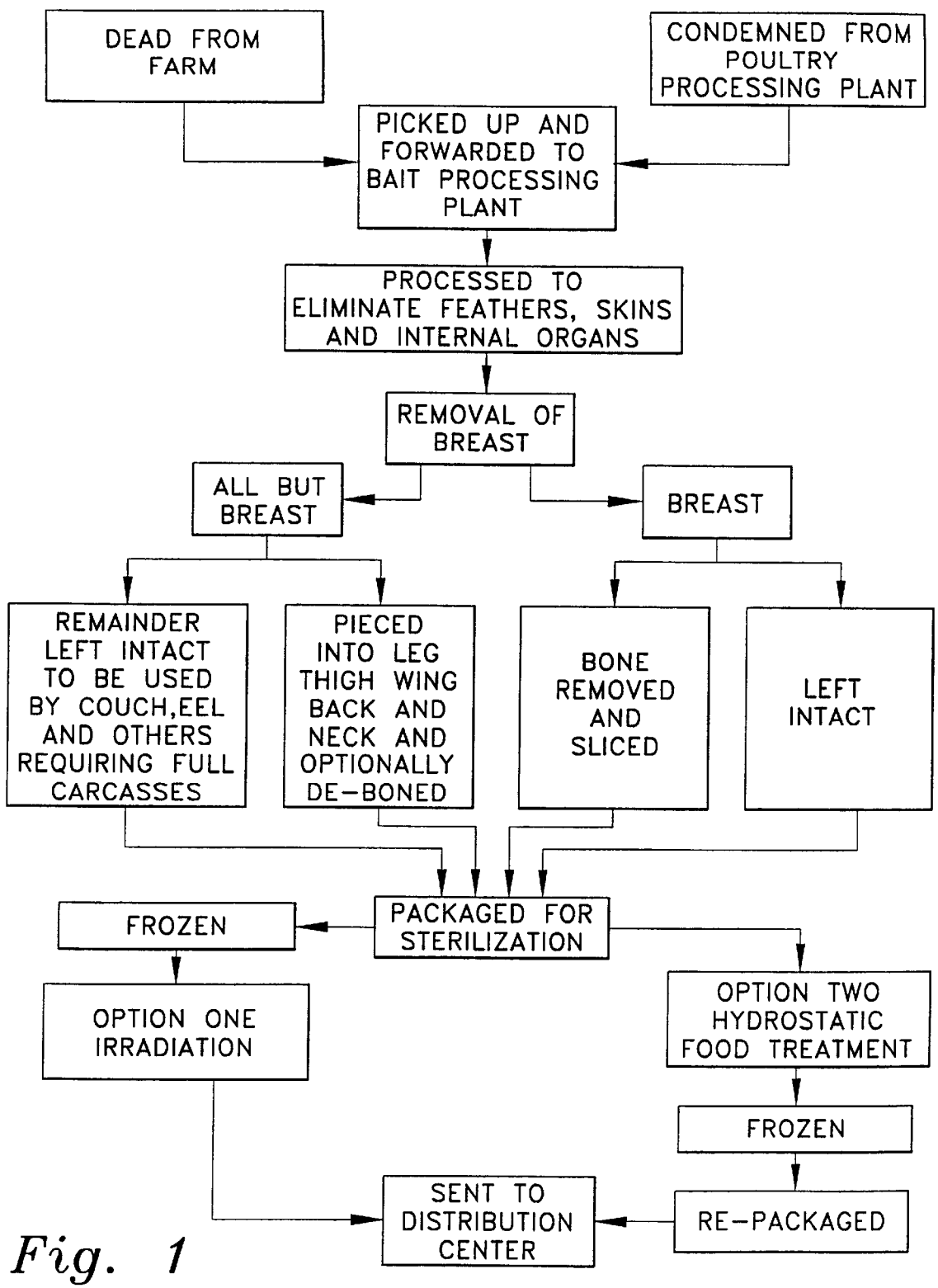
FIG. 1 is a process flowchart for a method for making bait for aquatic food sources according to the present invention.

The present invention is a method for making bait food from unusable poultry waste for aquatic food sources such as fish, crab, conch, eel, shrimp, lobster and crayfish 10, as outlined in FIG. 1.

The method includes receiving the unusable poultry waste, removing remaining feathers and internal organs from the poultry waste, removing breasts from the poultry waste, processing the poultry waste based on specific client requirements, packaging the poultry waste, sterilizing the poultry waste and sending the poultry waste to a distribution center.

The first step of the method involves receiving the unusable poultry waste. This waste takes the form of dead poultry from poultry farms and condemned poultry parts from poultry processing plants. The unusable poultry waste is put into refrigerated or freezer containers and is picked up and forwarded to a processing plant, where all of the poultry of usable size is processed to remove the remaining feathers and internal organs and, optionally, skin, which is the second step of the method.

The third step involves removing the breast portions from the remaining poultry waste. This is actually part of the next step of the method 10, which is processing the poultry waste based on specific client requirements. The breasts can be left intact and used for bait by individual fisherman, who will slice the meat from the breast bone into usable pieces or can remove the breast bone all together and slice the remaining breast meat into usable pieces. The instant contemplates this processing of the waste poultry (de-boning, slicing, etc.) as part of the inventive method.

The remaining carcasses that are left intact can also be used. Carcasses that are collected with the breasts removed and left intact are used for bait in the conch and eel fishing industry. These carcasses can also be pieced and separated into leg, thigh, wing, back and neck sections for other type of marine-based bait.

Once processing has been done according to various specific client requirements, the various forms of poultry waste are packaged, using conventional packaging techniques that are well-known to those schooled in the art. Once the various forms of poultry waste are packaged, the waste is then sterilized in their respective packaging. This is done to convert the poultry waste into a product that will have an acceptable shelf life and be free of pathogenic microorganisms such as Salmonella and *E. Coli* that are associated with foodborne diseases.

Figure 2:
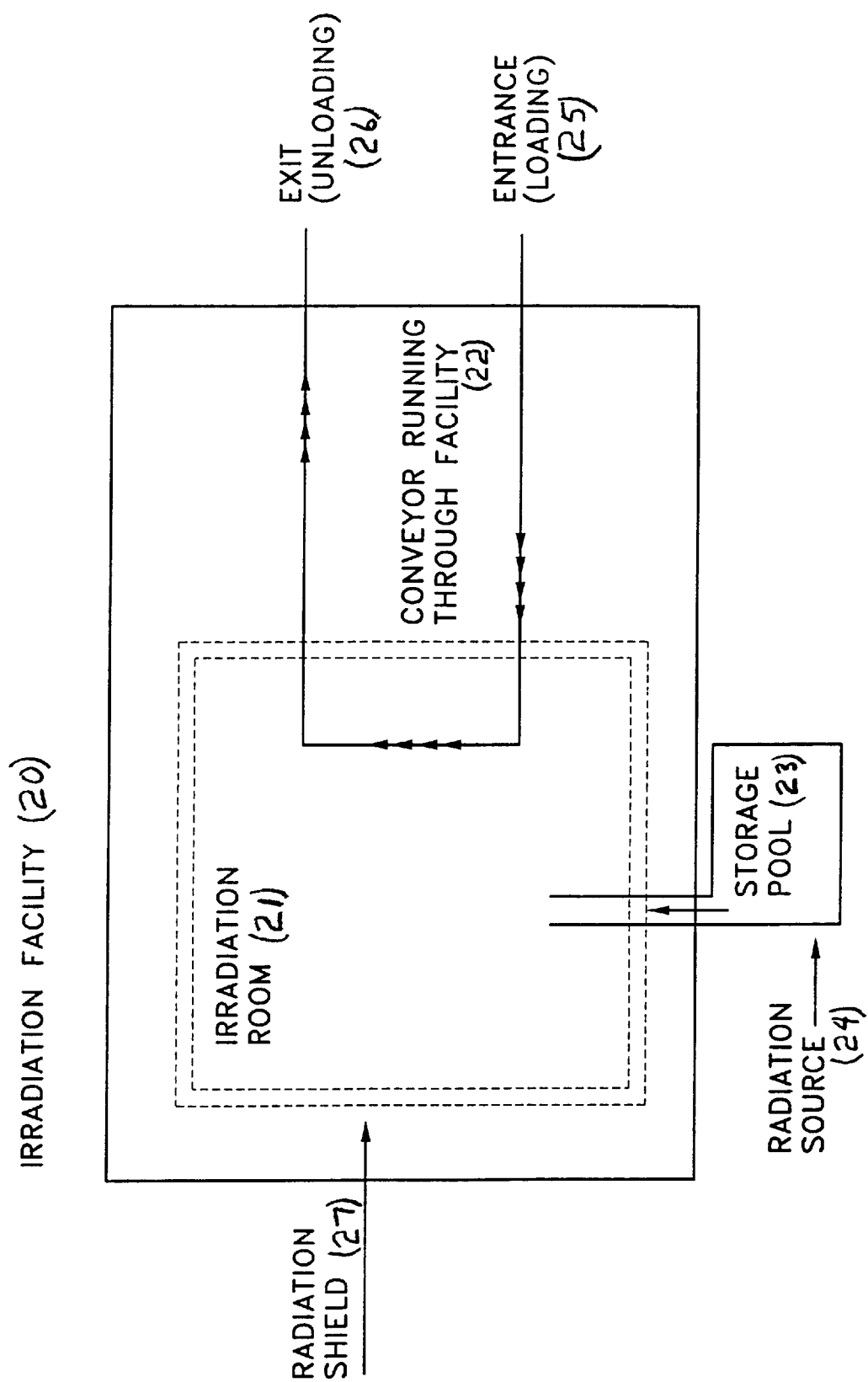
FIG. 2 is a diagram of an irradiation facility used in the first embodiment of the inventive process.

This process utilizes two methods of sterilization, each associated with a separate embodiment of the inventive process. The first embodiment of the method is irradiation, which is outlined in FIG. 2. The second embodiment of the method is the use of ultra high pressure hydrostatic treatment, which is outlined in FIG. 3.

An irradiation facility 20 used to sterilize packaged poultry waste comprises an irradiating room 21 to expose packaged poultry waste, a conveyor system 22 to transport the poultry waste into and out of the irradiating room 21, a storage pool 23 to hold a radiation source 24 for the irradiating room 21 and a loading entrance 25 and an unloading exit 26 to load and unload the packaged poultry waste.

The packaged poultry waste is loaded at the entrance area 25 of the irradiation facility 20, where it is then placed on the conveyor system 22 that runs throughout the irradiation facility 20. The packaged poultry waste is then sent into the irradiation room 21, which is surrounded by a radiation shield 27 which contains the radiation within the irradiation room 21. The radiation shield 27 consists of thick concrete walls and a thick concrete ceiling to confine the radiation within the irradiation room 21.

The radiation source 24 is cobalt 60, which is kept underground in the storage pool 23 and is pumped into the irradiation room 21. The cobalt 60 is exposed to the poultry waste while it is in its packaging. The packaged poultry waste then continues on the conveyor system 22, where it is then sent to the exit 26 to be unloaded.

The radiation used by the cobalt 60 is considered to be relatively low level radiation. The irradiation facility 20 is also subject to the strict regulatory guidelines to ensure safe operation. It is noted that the poultry waste may be frozen for the irradiation process. FIG. 1 shows that it is frozen before irradiation in the preferred embodiment; however, the invention contemplates freezing at another time or not at all.

Figure 3:
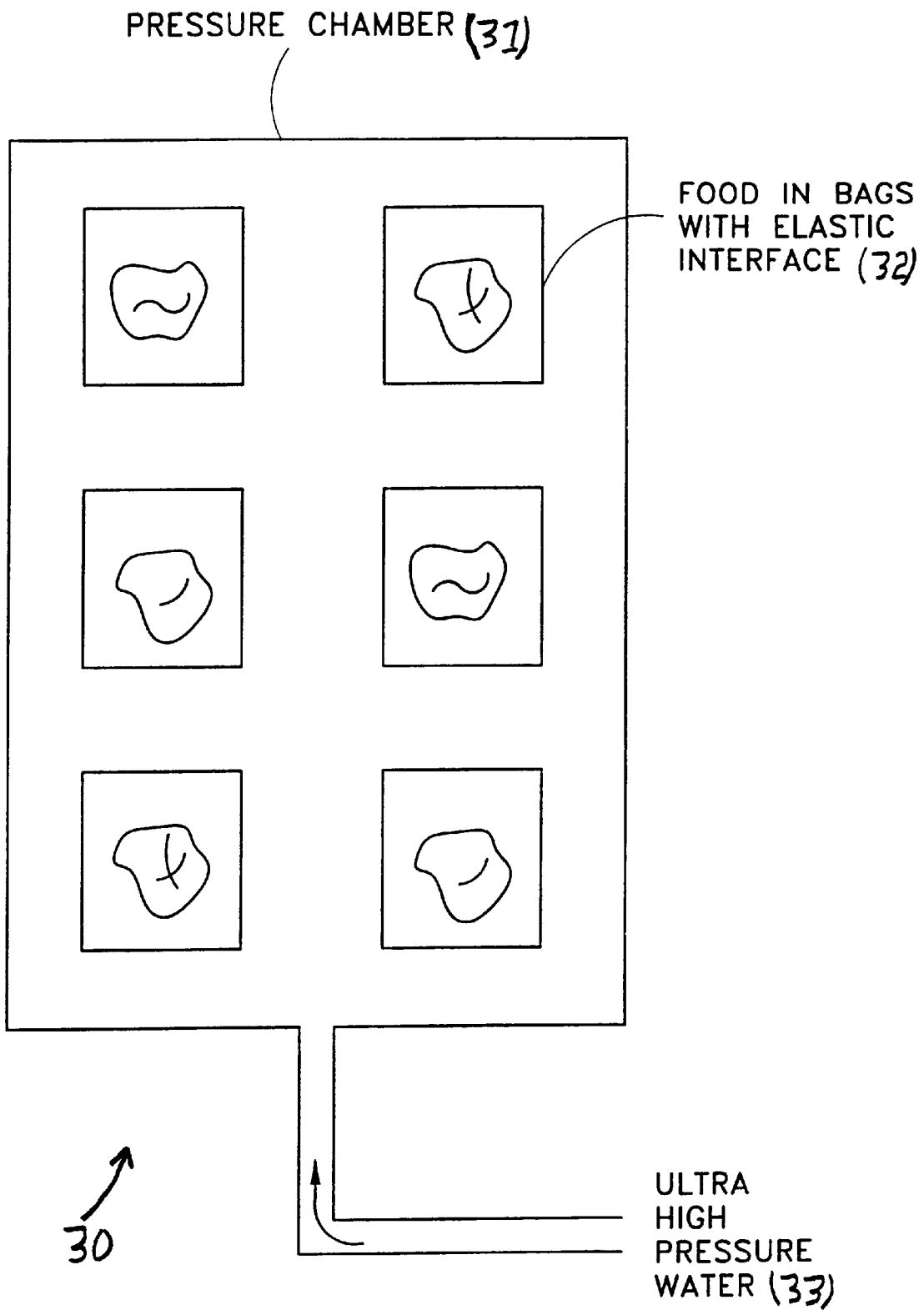
FIG. 3 is a diagram of an ultra high pressure batch production chamber used in the second embodiment of the inventive process.

FIG. 3 depicts a batch hydrostatic pressure system 30, which is the second embodiment inventive process used to sterilize poultry waste. An ultra high pressure chamber 31 is used to expose packaged poultry waste to ultra high water pressure 33 (approximately 80,000 PSI). The packaged poultry waste is placed in special permeable bags 32 containing at least one elastic interface, with the packaged poultry waste being placed in the ultra high pressure chamber 31 and being exposed to ultra high pressure water 33.

More specifically, the ultra high pressure chamber 31 is used for batch processing application of the ultra high water pressure technology. There is also a semi-continuous process application of the ultra high water technology designed for treatment of more pumpable materials.

FIG. 1 shows that in the preferred embodiment, the waste is frozen after the hydrostatic treatment. As above, the invention contemplates freezing at another time (although freezing before sterilization may reduce its effectiveness) or not at all. Waste sterilized in this manner may then be re-packaged (as the semi-permeable bag is not appropriate for distribution) for distribution.

It is to be understood that the present invention is not limited to the sole embodiments described above, but encompasses any and all embodiments within the scope of the following claims.

I claim:

1. A method for making bait food from unusable poultry waste comprising:

receiving the poultry waste wherein the poultry waste is dead poultry or condemned poultry parts;

removing remaining feathers and internal organs from the poultry waste;

removing breast portions from the poultry waste;

processing the poultry waste based on specific client requirements to obtain bait food;

packaging the bait food; and sterilizing the bait food.

2. The method of to claim 1, further including leaving the breasts intact.

3. The method of claim 1, further including removing a breast bone from the breast and slicing the remaining breast meat.

4. The method of claim 1, further including leaving poultry carcasses from the poultry waste intact.

5. The method of claim 1, further including separating the poultry waste into leg, thigh, wing, back and neck sections.

6. The method of claim 1, wherein said sterilizing includes irradiating the bait food.

7. The method of claim 1, wherein said sterilizing includes applying ultra high hydrostatic pressure to the bait food.

8. The method of claim 1 further including freezing the bait food either before or after said sterilizing.

9. The method of claim 1 further including freezing the bait food.

\* \* \* \* \*